United States Patent [19]
Yamamoto

[11] Patent Number: 4,971,358
[45] Date of Patent: Nov. 20, 1990

[54] SLIDER DRIVE MECHANISM AND SLIDE RAIL FOR PASSIVE SEAT BELT SYSTEM

[75] Inventor: Kazuo Yamamoto, Sagamihara, Japan

[73] Assignee: Nippon Seiko Kabushiki Kaisha, Tokyo, Japan

[21] Appl. No.: 373,277

[22] Filed: Jun. 28, 1989

[30] Foreign Application Priority Data

Jul. 1, 1988 [JP] Japan .............................. 63-87592[U]
Dec. 7, 1988 [JP] Japan ............................ 63-159304[U]

[51] Int. Cl.$^5$ .......................................... B60R 21/10
[52] U.S. Cl. ....................................... 280/804; 280/802
[58] Field of Search ........................ 280/802, 803, 804

[56] References Cited

U.S. PATENT DOCUMENTS

| | | | |
|---|---|---|---|
| 4,324,419 | 4/1982 | Ueda | 280/804 |
| 4,565,391 | 1/1986 | Kawai | 280/804 |
| 4,575,120 | 5/1986 | Volk et al. | 280/804 |
| 4,623,168 | 11/1986 | Yokote | 280/804 |
| 4,647,070 | 3/1987 | Yamamoto | 280/804 |

*Primary Examiner*—Kenneth R. Rice
*Attorney, Agent, or Firm*—Wegner, Cantor, Mueller & Player

[57] ABSTRACT

In an automobile passive seat belt system, a slider carrying an occupant-restraining webbing fastened to an end portion thereof is guided by a drive member between a release position and an restraining position along a slide rail. The end portion is farthest from the slide rail. The slide rail has a first guide portion for guiding the drive member and a second guide portion for guiding the slider. The slider has a projection extending into the first guide portion. The projection constitutes an inner end of a slider portion at which the slider is in contact with the guide rail while sliding along the guide rail.

9 Claims, 3 Drawing Sheets

SLIDER DRIVE MECHANISM AND SLIDE RAIL FOR PASSIVE SEAT BELT SYSTEM

BACKGROUND OF THE INVENTION (1) Field of the Invention:

This invention relates to an automobile seat belt system, and especially to a slider drive mechanism and a slide rail for a two-point electric passive seat belt system.

(2) Description of the Related Art:

A passive seat belt system for an automobile serves to automatically restrain an occupant to protect him safely in the event of a vehicular emergency such as a collision when he enters the automobile and also to automatically release him when he egresses from the automobile.

The overall construction of a passive seat belt system is show in FIG. 4. An occupant-restraining webbing 1 is fastened to a slider 2. The slider 2 is driven by a motor 3 via a wire rope, free of illustration, so that the slider 2 may move between a release position and a restraining position along a slide rail 4.

FIG. 6 is a transverse cross-sectional view of a conventional passive slide rail 4. The interior of the slide rail 4 is divided into a wire guide channel 10 and a slider guide channel 11. It has been difficult to reduce the height, i.e., the vertical dimension of the slide rail 4 because the wire guide channel 10 and slider guide channel 11 are located centrally.

FIG. 7 is a transverse cross-sectional view showing a wire rope 8 and the slider 2, both, received in the slide rail 4. If the height of the slider 2 is reduced in order to reduce the height of the slide rail 4, the height $L'$ becomes shorter in FIG. 7. As a result, the reaction forces $R'_1$, $R'_2$ which the slide rail 4 produces upon application of a tensile force F (see FIG. 2) to the slider 2 from the webbing 1 (see FIG. 1) become still greater, whereby the friction between the slider 2 and the slide rail 4 increases to give a greater load upon movement of the slider 2 for restraint or release. This significantly affects the time required for the movement of the slider 2, especially, at low temperatures. This leads to the need for a more powerful motor. When a transverse force is applied to the slider 2, forces equal to the reaction forces $R'_1$, $R'_2$ are also applied to the slide rail 4 so that the slider 2 tends to undergo more derailing. For these reasons, it has been difficult to simply reduce the height of the slider 2.

SUMMARY OF THE INVENTION

An object of this invention is therefore to provide a seat belt drive mechanism using a short and small slide rail without any substantial sacrifice of performance and strength.

It has now been found that the above object can be achieved by providing a projection at an inner, namely, proximal portion of a slider in such a way that the projection extends into a hollow portion defining a wire guide portion.

In one aspect of this invention, there is thus provided an automobile passive seat belt system of the type that a slider carrying an occupant-restraining webbing fastened to an end portion thereof is guided by a drive member between a release position and an restraining position along a slide rail, said end portion being farthest from the slide rail. The slide rail has a first guide portion for guiding the drive member and a second guide portion for guiding the slider. The slider has a projection extending into the first guide portion. The projection constitutes an inner end of a slider portion at which the slider is in contact with the guide rail while sliding along the guide rail.

It is preferable to offset a straight portion, through which the wire guide portion and a slider guide portion are communicated to each other, and an opening for the slider from an imaginary longitudinal center plane of the slide rail, said plane extending substantially in parallel with the slider.

Since the projection extends from the slider into the first guide portion, the slide rail can be formed shorter than conventional guide rails. The projection serves as a part of the slider, so that a substantial area of contact is maintained between the slider and guide rail to ensure a good support for the slider in spite of the shorter height of the guide rail. Further, the offsetting of the straight portion and the opening makes it possible to have the drive member and the projection of the slider overlapped in the direction of movement of the slider. According to the present invention, shorter and smaller slide rails are realized so that trims for roof side, front pillar and center pillar of automobiles can be formed smaller. It is also possible to provide low-cost slide rails because they can be made smaller without any problem in strength.

DETAILED DESCRIPTION OF THE INVENTION AND PREFERRED EMBODIMENT

Figure 4:
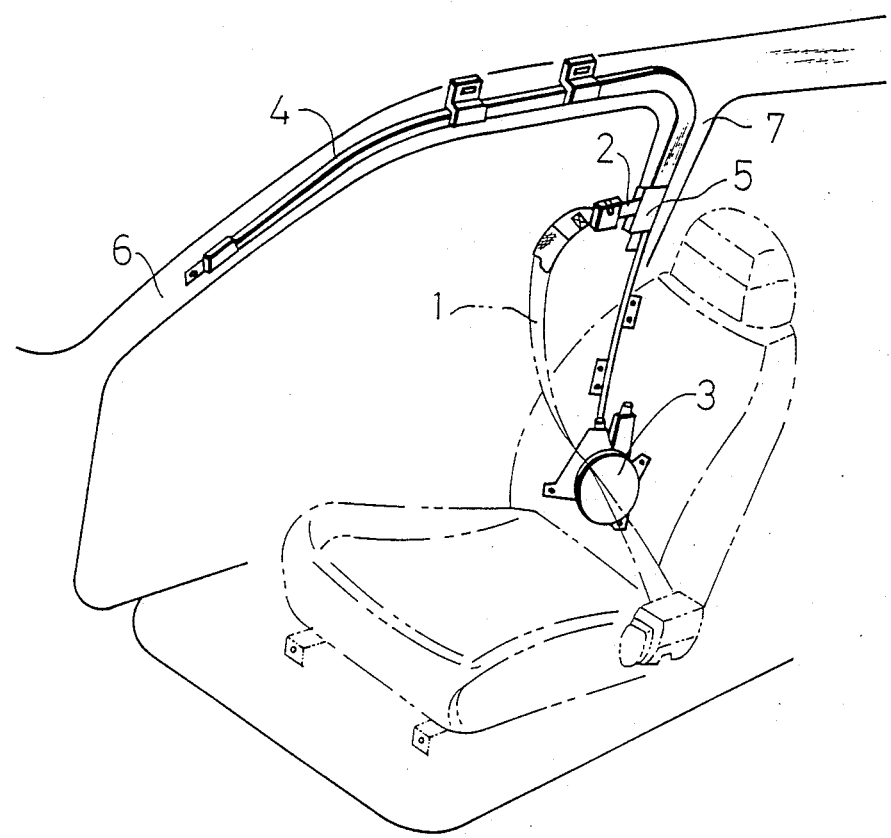
FIG. 4 is a schematic illustration showing the overall construction of a general passive seat belt system.

The term "inner" as used herein in connection with a slider is defined relative to its associated slide rail. Therefore, the term "inner" means "top" or "upper" so long as the slider is located along a roof side. The term "inner" however means "rear" when the slider is located along a center pillar, i.e., B-pillar as shown in FIG. 4.

The automobile passive seat belt system according to one embodiment of this invention will hereinafter be described with reference to FIGS. 1, 2, 3 and 5.

Figure 1:
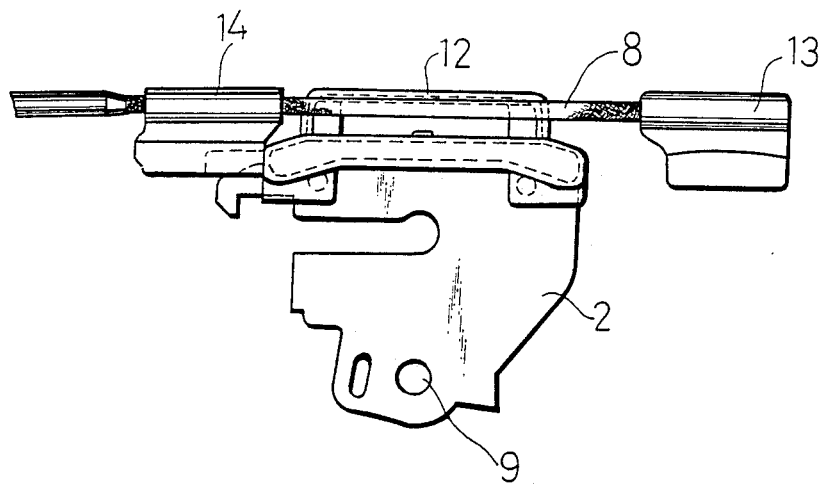
FIG. 1 is a fragmentary plan view of an automobile passive seat belt system according to one embodiment of this invention, in which a slider and a part of a drive member are illustrated.

Reference is first had to FIG. 1, in which a flange 12 is provided as a projection on an upper portion of the slider 2. An unillustrated webbing is fastened to the slider 2 by way of a member, free of illustration, fixed in a hole 9 formed at a distal end portion, namely, a lower portion of the slider 2. The wire rope 8 is covered with a synthetic resin. The wire rope 8 is however not covered at a portion corresponding to the flange 12, so that wires of the wire rope 8 are exposed there. FIG. 1 illustrates that a cam portion 14 provided fixedly on the wire rope 8 on a left side relative to the flange 12 is in contact with the slider 2 and is driving the slider 2 rightwards. The peripheral surface of the wire rope 8 is covered with the synthetic resin on the left side of the cam portion 14. For driving the slider 2 leftwards, a connector 13 also provided fixedly on the wire rope 8 is brought leftwards into contact with the slider 2.

Figure 2:
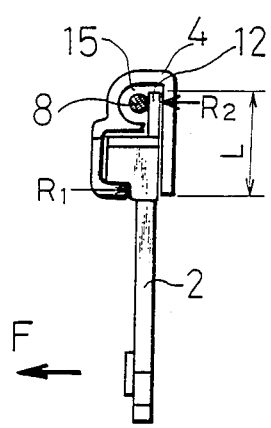
FIG. 2 is a transverse cross-section of a rail and the slider in the automobile passive seat belt system of FIG. 1.
Figure 3:
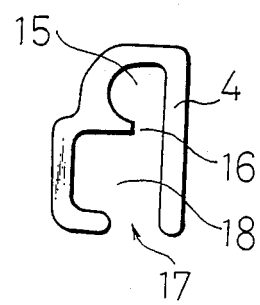
FIG. 3 is a transverse cross-section of the rail of FIG. 2.

As depicted clearly in FIG. 3, a wire guide channel 15 and a slider guide channel 18 communicate to each other through a strait portion 16 in the slide rail 4. The slider 2 extends downwardly, namely, outwardly through a slot 17. The straight portion 16 and slot 17 are offset to the same side from a vertical center line, namely, from an imaginary longitudinal center plane of the slide rail. When a slide rail having similar configurations to FIG. 3 is employed, the flange 12 provided on the upper portion of the slider 2 can be inserted into the space of the wire guide channel 15 without forming any collars on the wire rope 8 as shown in FIG. 2.

Figure 5:
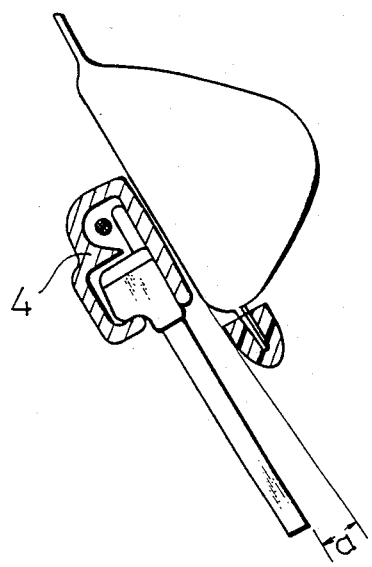
FIG. 5 is a partly cross-section of the rail and slider of FIG. 2, which are mounted on a roof side.
Figure 6:
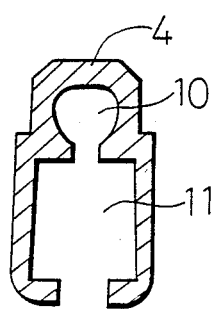
FIG. 6 is a transverse cross-section of a conventional rail.
Figure 7:
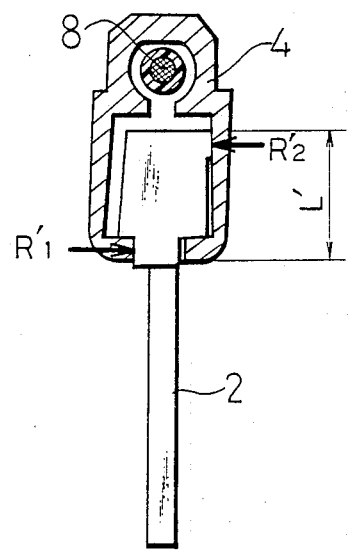
FIG. 7 is a transverse cross-section of the conventional rail of FIG. 6 and an associated conventional slider.

Referring now to FIG. 5, the offsetting of the strait portion 16 and slot 17 from the imaginary longitudinal center plane of the slide rail 4 has made it possible to reduce the space a between the roof side and the slider 2 compared to the conventional example depicted in FIG. 7. This allows to form a smaller opening in an associated trim and to increase the head clearance. The reduced size of the slide rail gives better forward visibility around an A-pillar compared to conventional slide rails.

The slider 2 is provided with an emergency release buckle (ERB) in FIG. 4. Needless to say, the present invention can be applied equally to automobile passive seat belt systems having a slider which is provided with a tongue and a webbing-carrying anchor plate.

What is claimed is:

1. In an automobile passive seat belt system of a type wherein a slider carrying an occupant-restraining webbing fastened to an end portion thereof is guided by a drive member between a release position and a restraining position along a slide rail, said end portion being farthest from the slide rail, the improvement wherein the slide rail has a first guide portion for guiding the drive member and a second guide portion for guiding the slider; the slider has a projection extending into the first guide portion; and the projection is offset from an imaginary longitudinal center plane of the slide rail toward a vehicle body on which the slide rail is mounted so that the projection forms a slider portion at which the slider is in contact with the guide rail while sliding along the guide rail.

2. The system as claimed in claim 1, wherein the projection and drive member are arranged in such a way that they overlap each other in the direction of movement of the slider.

3. The system as claimed in claim 1, wherein the drive member is a wire rope whose peripheral surface is covered except for a peripheral surface portion adjacent to the projection.

4. An automobile passive seat belt system comprising:
a slide rail;
a slider moveable along said slide rail between a release position and a restraining position, said slider being moved along said slide rail by a drive member; and
an occupant-restraining webbing fastened to a distal end portion of said slider;
wherein said slide rail comprises:
a first guide portion for guiding said drive member,
a second guide portion for guiding said slider, and
a straight portion, said straight portion being offset from an imaginary longitudinal center plane of the slide rail which extends substantially in parallel with said slider,
wherein said first guide portion and said guide portion communicate through said straight portion.

5. The system as claimed in claim 4, wherein said slide rail is provided with a slot, wherein said slider extends outwardly from the second guide portion through said slot, and wherein said straight portion and said slot are offset to one side of said imaginary longitudinal center plane.

6. In an automobile passive seat belt system of a type wherein a slider carrying an occupant-restraining webbing fastened to an end portion thereof is guided by a drive member between a release position and a restraining position along a slide rail, said end portion being farthest from the slide rail, the improvement wherein the slide rail has a first guide portion for guiding the drive member and a second guide portion for guiding the slider; the slider has a projection extending into the first guide portion; and the projection constitutes an inner end of a slider portion at which the slider is in contact with the guide rail while sliding along the guide rail;
wherein the first and second guide portions communicate to each other through a straight portion, and the straight portion is offset from an imaginary longitudinal center plane of the slide rail, said plane extending substantially in parallel with the slider.

7. The system as claimed in claim 3, wherein the slide rail defines a slot through which the slider extends outwardly from the second guide portion, and the straight portion and slot are offset to the same side from the imaginary longitudinal center plane of the slide rail.

8. In an automobile passive seat belt system of a type wherein a slider carrying an occupant-restraining webbing fastened to an end portion thereof is guided by a drive member between a release position and a restraining position along a slide rail, said end portion being farthest from the slide rail, the improvement wherein the slide rail has a first guide portion for guiding the drive member and a second guide portion for guiding the slider; the slider has a projection extending into the first guide portion; and the projection constitutes an inner end of a slider portion at which the slider is in contact with the guide rail while sliding along the guide rail;
wherein the slide rail defines a slot through which the slider extends outwardly, and the slot is offset from an imaginary longitudinal center plane of the slide rail, said plane extending substantially in parallel with the slider.

9. An automobile passive seat belt system comprising:
a slide rail;
a slider moveable along said slide rail between a release position and a restraining position, said slider being moved along said slide rail by a drive member; and
an occupant-restraining webbing fastened to a distal end portion of said slider;
wherein said slide rail comprises a slider guide portion for guiding said slider, said slide rail being provided with a slot;
wherein said slide rail extends outwardly from said slider guide portion through said slot; and
wherein said slot is offset from an imaginary longitudinal center plane of the slide rail which extends substantially in parallel with the slider.

* * * * *